US006705754B2

(12) United States Patent
Winkler et al.

(10) Patent No.: US 6,705,754 B2
(45) Date of Patent: Mar. 16, 2004

(54) DEVICE AND METHODS FOR MIXING FLUIDS

(75) Inventors: James L. Winkler, Sunnyvale, CA (US); Mark Chee, Palo Alto, CA (US); David Lockhart, Mountain View, CA (US)

(73) Assignee: Affymetrix, Inc., Santa Clara, CA (US)

( * ) Notice: Subject to any disclaimer, the term of this patent is extended or adjusted under 35 U.S.C. 154(b) by 0 days.

(21) Appl. No.: 10/062,431

(22) Filed: Jan. 30, 2002

(65) Prior Publication Data

US 2002/0071339 A1 Jun. 13, 2002

Related U.S. Application Data

(63) Continuation of application No. 09/487,506, filed on Jan. 19, 2000, now abandoned, which is a continuation of application No. 09/032,724, filed on Feb. 27, 1998, now Pat. No. 6,050,719, which is a continuation-in-part of application No. 09/016,564, filed on Jan. 30, 1998, now abandoned.

(51) Int. Cl.[7] .................................................. B01F 11/00
(52) U.S. Cl. ..................... 366/144; 366/214; 435/303.3
(58) Field of Search ................................. 366/144–146, 366/208, 213, 214, 220, 209; 422/209; 438/303.1–303.3; 211/1.52, 1.53, 1.55, 164, 58, 78, 163

(56) References Cited

U.S. PATENT DOCUMENTS

| | | | | |
|---|---|---|---|---|
| 423,362 A | * | 3/1890 | Wells | |
| 493,046 A | * | 3/1893 | Shumway | |
| 2,914,384 A | | 11/1959 | Al-Marachy | ................. 422/73 |
| 3,090,604 A | * | 5/1963 | Wheeler | |
| 3,232,247 A | * | 2/1966 | Vaughan | |
| 3,233,975 A | | 2/1966 | McCormick | ................. 222/456 |
| 4,329,068 A | * | 5/1982 | Neuner et al. | |
| 4,625,867 A | * | 12/1986 | Guibert | |
| 4,801,431 A | | 1/1989 | Cuomo et al. | ............... 422/104 |
| 4,892,412 A | * | 1/1990 | Thomas | |
| 4,892,830 A | | 1/1990 | Findley et al. | ........... 435/286.6 |
| 4,907,893 A | | 3/1990 | Niemeck et al. | ............ 366/144 |
| 5,009,316 A | | 4/1991 | Klein | ......................... 206/443 |
| 5,162,237 A | | 11/1992 | Messenger et al. | ......... 436/523 |
| 5,231,029 A | | 7/1993 | Wootton et al. | .......... 435/303.2 |
| 5,266,272 A | | 11/1993 | Griner et al. | ................ 422/104 |
| 5,380,662 A | | 1/1995 | Robbins et al. | .......... 435/303.1 |
| 5,516,692 A | * | 5/1996 | Berndt | |
| 5,635,398 A | | 6/1997 | Kapka et al. | ............. 435/286.7 |
| 5,665,309 A | | 9/1997 | Champseix et al. | ........... 422/63 |
| 5,753,187 A | * | 5/1998 | Reynolds | |
| 6,050,719 A | * | 4/2000 | Winkler et al. | |
| 6,386,749 B1 | * | 5/2002 | Watts et al. | |

FOREIGN PATENT DOCUMENTS

| | | |
|---|---|---|
| DE | 297 19 099 U1 | 4/1998 |
| GB | 2 229 814 A | 10/1990 |
| GB | 2229814 | * 10/1990 |
| WO | WO 95/33846 | 12/1995 |
| WO | WO 97/21834 | 6/1997 |

OTHER PUBLICATIONS

Product literature of the Rotamix rotator from Appropriate Technical Resources, Inc., P.O. Box 460, Laurel, MD 20725.

* cited by examiner

Primary Examiner—Charles E. Cooley
Assistant Examiner—David Sorkin
(74) Attorney, Agent, or Firm—Townsens and Townsend and Crew LLP

(57) ABSTRACT

The invention provides exemplary devices, systems and methods for mixing of fluids, such as biological fluids. One exemplary device comprises is particularly adapted for holding at least one cartridge having a chamber containing a biological fluid, with the chamber having a generally planar face. The device comprises a rotatable body having a rotational axis. The rotatable body includes at least one mounting element which is adapted to mount the rotatable body such that the face of the chamber is generally perpendicular to the rotational axis.

9 Claims, 5 Drawing Sheets

Fig. 3
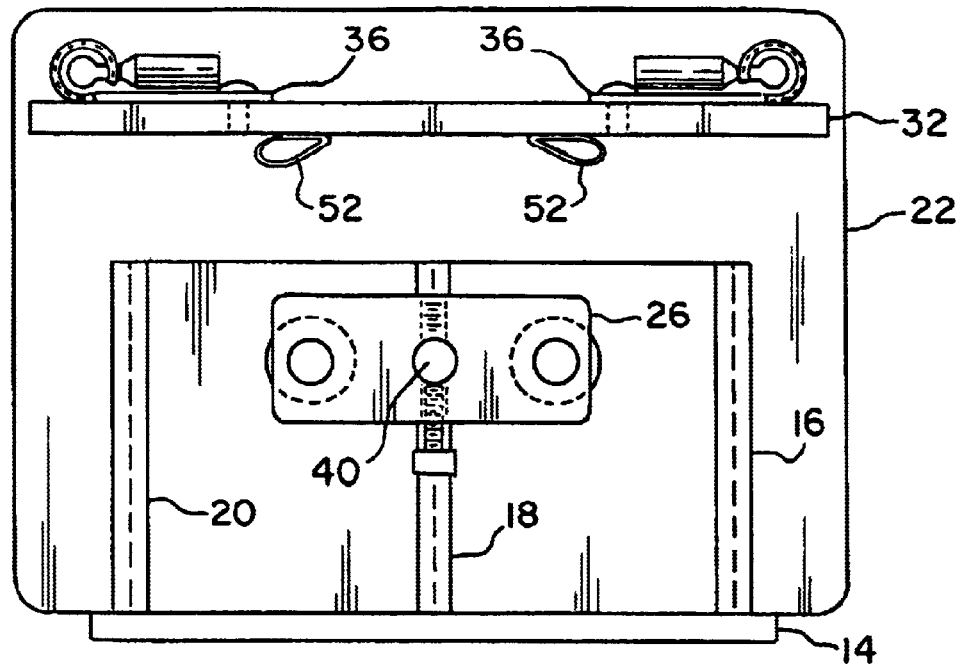
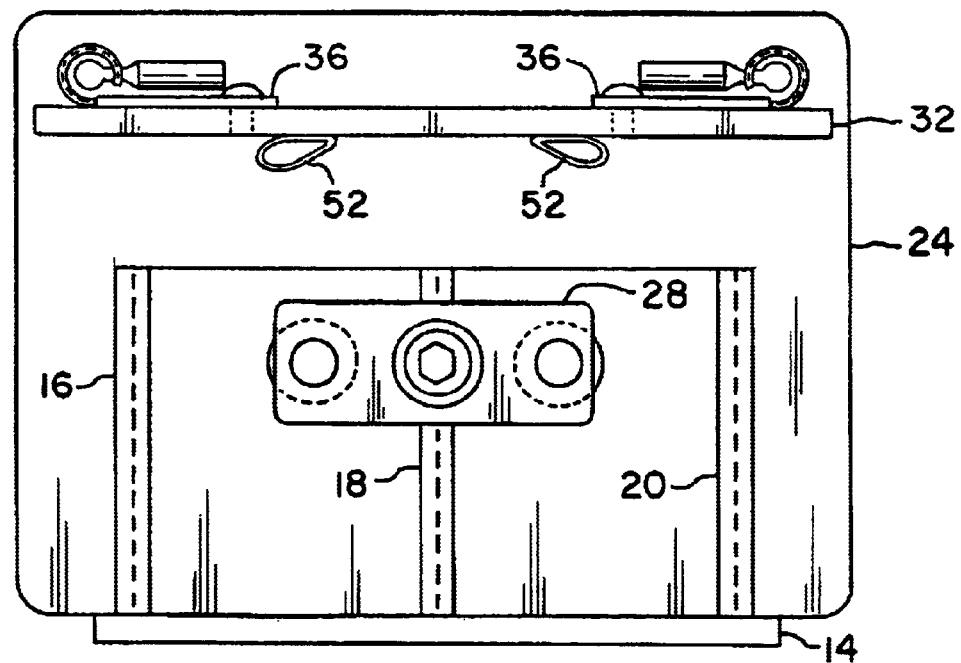
Fig. 4

DEVICE AND METHODS FOR MIXING FLUIDS

This application is a continuation of and claims the benefit of U.S. patent application Ser. No. 09/487,506 filed Jan. 19, 2000, now abandoned, which is a continuation of U.S. patent application Ser. No. 09/032,724 filed Feb. 27, 1998, now U.S. Pat. No. 6,050,719, issued Apr. 18, 2000, which is a continuation-in-part of U.S. patent application Ser. No. 09/016,564, filed Jan. 30, 1998 (now abandoned), the disclosures of which applications are incorporated by reference.

BACKGROUND OF THE INVENTION

This invention relates generally to the field of mixing, and in particular to the mixing of fluids. In one particular aspect, the invention relates to the mixing of biological fluids within a chamber which is disposed within a heated environment.

Methods for using arrays of polymers to identify receptors with specific affinities for one of the polymers in the array are known. For example, one method uses immobilized antibodies to analyze binding to peptide ligands or vice-versa. Another type of method uses immobilized oligonucleotides to analyze hybridization to a target nucleic acid. For instance, U.S. patent application Ser. No. 08/624,312, filed Mar. 26, 1996, the complete disclosure of which is herein incorporated by reference, describes apparatus and methods for carrying out repeated hybridizations of a target nucleic acid to an array of nucleic acid probes. Such polymer arrays are described in, e.g., U.S. Pat. No. 5,143,854 and published PCT Application Nos. WO90/15070 and WO92/10092, the complete disclosures of which are herein incorporated by reference. These polymer arrays are nucleic acid arrays which include a plurality of different polynucleotides coupled to a substrate in different known locations.

In one exemplary arrangement, such arrays are packaged within a housing, like those described in, e.g., pending U.S. patent application Ser. No. 08/624,312, previously incorporated by reference, Ser. Nos. 08/485,452, filed Jun. 7, 1995, and 08/528,173, filed Sep. 19, 1995, and published PCT Application No. WO95/33846. The disclosures of all of these references are herein incorporated by reference. In brief, such a housing typically includes a body having a reaction cavity or hybridization chamber. The array or substrate is mounted over the cavity on the body such that the front side of the array substrate, e.g., the side upon which the polynucleotides are situated, is in fluid communication with the cavity. The cartridge includes inlet and outlet ports to allow various fluids to be introduced into and removed from the hybridization chamber.

During hybridization, it is often desirable to provide an efficient and effective way to mix the fluids within the chamber. This can be challenging since the chamber is typically in a temperature controlled environment, such as in an oven. Additionally, in at least one embodiment, the interior of the chamber is narrow, and it can be difficult to mix or agitate the fluid when within the chamber.

Hence, it would be desirable to provide devices, systems and methods to facilitate the mixing of fluids which are held within a hybridization chamber to improve the hybridization process. Such devices, systems and methods should be cost effective, easy to use, and be compatible with the constraints of the hybridization process. In particular, it would be desirable if mixing of the fluid could be facilitated while the chamber is within a temperature controlled environment, such as an oven.

SUMMARY OF THE INVENTION

The invention provides systems, devices and methods for facilitating the mixing of various fluids within a chamber. In one exemplary embodiment, a system is provided which comprises at least one cartridge having a chamber for holding a fluid (which is preferably a biological fluid), with the chamber including a generally planar face. The system further includes a rotatable body having a rotational axis. The rotatable body includes at least one mounting element to removably mount the cartridge to the rotatable body such that the face of the chamber is generally perpendicular to the rotational axis.

In one exemplary aspect, the mounting element comprises a pair of opposing walls which each include at least one slot. The slots are arranged such that the cartridge is insertable into the slots. Conveniently, the rotatable body may also include a base which connects the pair of walls. Preferably, the rotational axis extends through one of the walls. In this way, the cartridge will be spaced apart from the rotational axis to facilitate mixing of the fluid when the body is rotated.

In another aspect, the opposing walls are parallel to each other and the slots are configured such that the face of the chamber is generally perpendicular to the walls when placed into the slots. Preferably, at least one of the slots is keyed such that the cartridge is insertable into the slot in only one orientation. Optionally, each wall may include a plurality of slots which are arranged such that multiple cartridges may be inserted into the slots in a parallel arrangement. It will be appreciated that the rotatable body may include additional numbers of parallel walls which each include slots so that multiple cartridges may be removably mounted to the body.

In one aspect, a lid is also provided and is operably attached to at least one of the walls. The lid is movable between an open and a closed position, with the lid securing the cartridge within the slots when the lid is in the closed position. At least one coupling element is preferably operably attached to the body in alignment with the rotational axis. In this way, the coupling element may couple the rotatable body to a rotation mechanism.

In one particular aspect, the chamber includes a pair of planar spaced apart faces which define an interior having the fluid. The faces are generally rectangular or square in geometry, and the cartridge is mounted to the body such that the faces are generally perpendicular to the rotational axis to facilitate mixing of the fluid within the chamber.

The body will preferably be rotated about the rotational axis at a rate in the range from about 30 rpm to about 90 rpm, and more preferably from about 50 rpm to about 60 rpm. Further, the rotational body will preferably be placed within a temperature controlled environment during rotation of the body. In one particular aspect, the chamber is heated to a temperature in the range from about 30° C. to about 60° C., and more preferably from about 40° C. to about 50° C., while the body is rotating. Such heating may be accomplished, for example, by placing the rotatable body within an oven.

In a preferred aspect, the device will be fabricated of transparent plastic materials, such as PLEXIGLAS or other suitable lightweight, rigid, machinable material and be a generally amber color such that wavelengths of light in the range of 200 nm to 700 nm will be filtered out.

BRIEF DESCRIPTION OF THE DRAWINGS

FIG. 3 is a right side view of the device of FIG. 1.

FIG. 4 is a left side view of the device of FIG. 1.

DETAIL DESCRIPTION OF THE SPECIFIC EMBODIMENTS

The invention provides exemplary devices, systems and methods to facilitate the mixing of fluids that are held within a chamber, and will preferably be used in connection with biological fluids. Although useful in mixing a wide variety of biological fluids, the invention will find its greatest use when mixing a sample within a hybridization chamber having a polymer array. Although the invention will find particular use in connection with hybridization reactions and, more specifically, nucleic acid hybridizations, it should be appreciated that the invention will be useful in facilitating a variety of reactions where mixing is required, including, e.g., extension or amplification reactions using tethered probes as template or primer sequences, screening of receptors against arrays of small molecules, peptides or peptideomimetics, carbohydrates, and the like.

The invention will find use in facilitating the mixing of fluids within chambers having a wide variety of configurations and geometries. However, the invention will be particularly useful with chambers which are relatively narrow in geometry, e.g., defined by two closely spaced apart planar walls. Such chambers are described in co-pending U.S. application Ser. Nos. 08/624,312, 08/485,452 and 08/528,173 and PCT Application No. WO95/33846, previously incorporated herein by reference.

The invention provides for the mixing of the various fluids by rotating the chambers about a rotational axis that is generally perpendicular to the narrow chamber. Rotation in this manner is particularly advantageous when the chamber includes corners, such as in a rectangular or square chamber. When rotating the chamber about the rotational axis, the fluid within the chamber will become agitated as the direction of flow is hindered due to the change in direction of the walls. In this way, mixing of the fluid is facilitated.

According to the invention, mixing will preferably occur while the chamber is within a temperature controlled environment. Typically, the chamber will be included within an oven so that the chamber may be heated while the chamber is being rotated. For example, one such oven which may be modified to receive a rotating chamber is a General Purpose Incubator, Model 1535, commercially available from VWR Scientific Products, West Chester, Pa.

Referring now to the figures, an exemplary embodiment of a device 10 for holding cartridges having a chamber containing a fluid will be described. The fluid held within the chamber will preferably comprise a biological fluid. The cartridges will preferably be of the type described generally in co-pending U.S. application Ser. Nos. 08/624,312, 08/485,452 and 08/528,173 and PCT Application No. WO95/33846, previously incorporated by reference. Such cartridges are illustrated generally in FIG. 5 and will be described in greater detail hereinafter.

Figure 2:
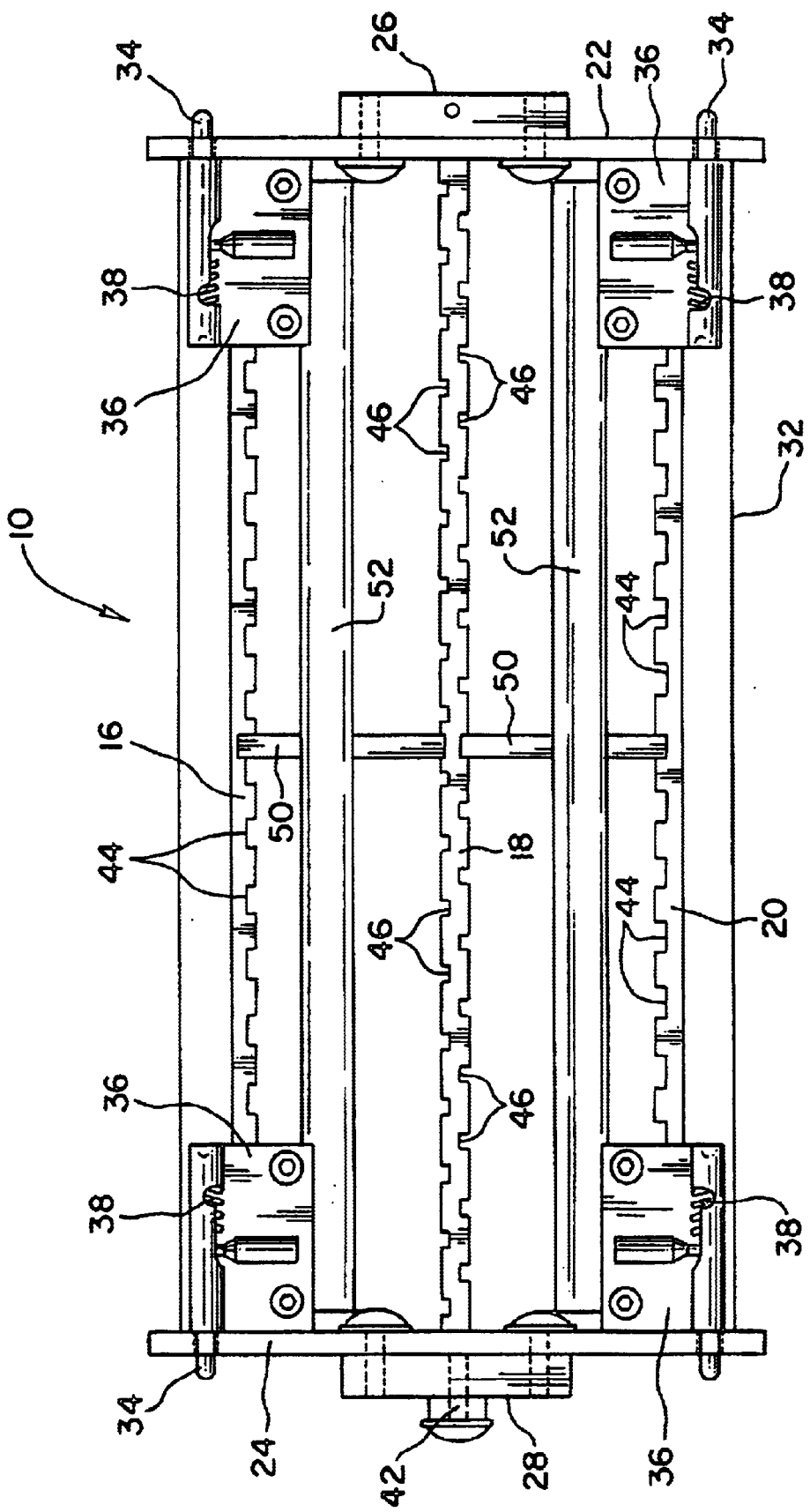
FIG. 2 is a top view of the device of FIG. 1.

Device 10 comprises a rotational body 12 having a base 14, a plurality of parallel spaced apart walls 16, 18 and 20, and two end pieces 22 and 24. As best shown in FIGS. 2–4, coupling elements 26 and 28 are attached to end pieces 22 and 24, respectively. Extending between coupling elements 26 and 28 (and through wall 18) is a rotational axis about which body 12 is rotated as described in greater detail hereinafter.

Figure 1:
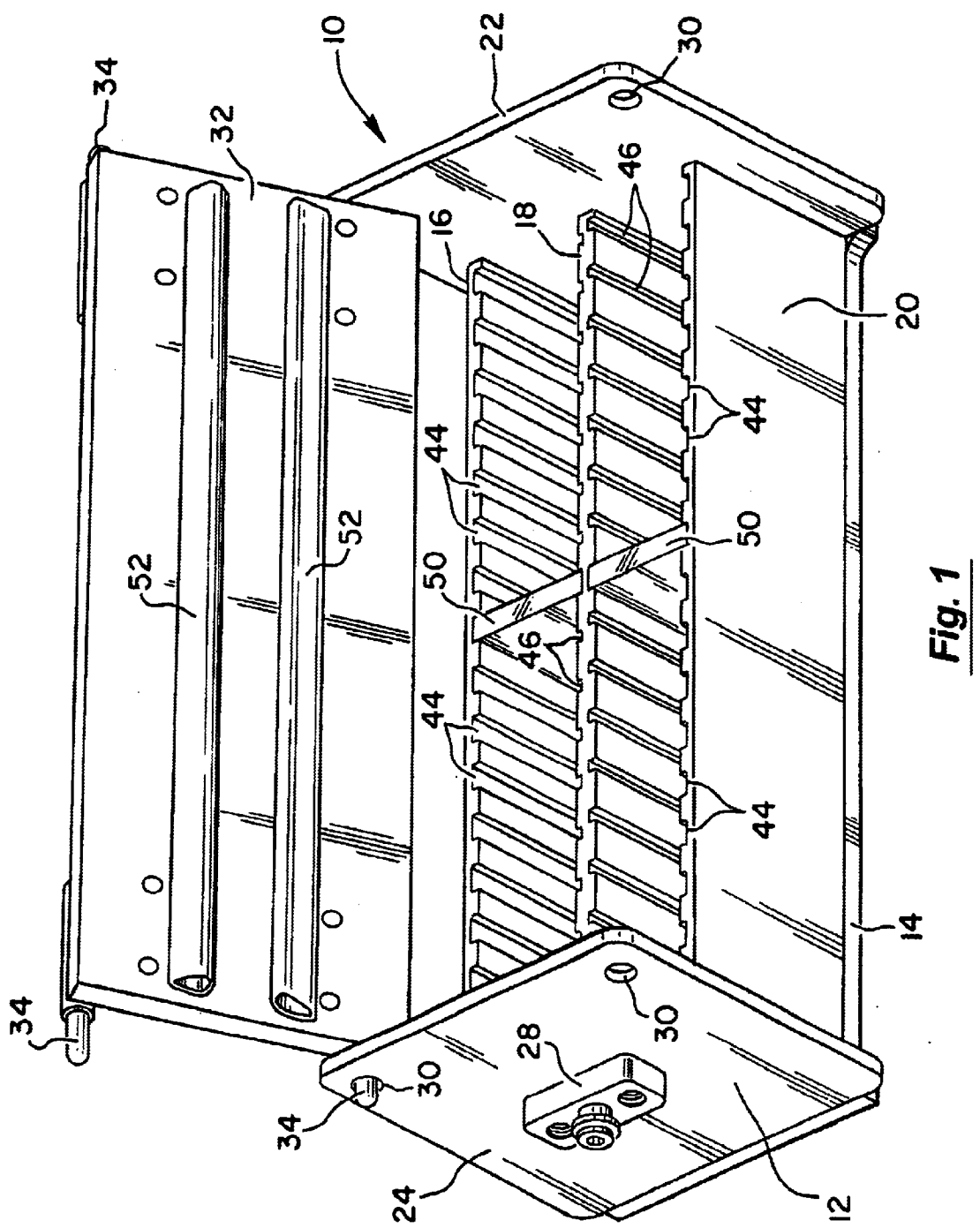
FIG. 1 is a perspective view of an exemplary device for holding multiple cartridges which each include a hybridization chamber according to the invention.

End pieces 22 and 24 each include a set of apertures 30 as best shown in FIG. 1. Apertures 30 are employed to couple a lid 32 to end pieces 22 and 24. As shown in FIG. 1, lid 32 is in an open position. In FIGS. 2–4, lid 32 is in a closed position. Lid 32 is coupled to end pieces 22 and 24 by rods 34, which in turn are attached to lid 32 by brackets 36. A spring 38 is disposed within each of brackets 36 to bias rods 34 toward their respective aperture 30 so that lid 32 will be secured to end pieces 22 and 24 when in the closed position.

The elements used to construct body 12 will preferably comprise a generally rigid, heat resistant material that may withstand temperatures that are within the range of from about 30° C. to about 60° C., and more preferably from about 40° C. to about 50° C. Conveniently, the elements used to construct body 12 comprise a plastic material, with a preferable material being sold under the trade name of Plexiglas. Other suitable lightweight, rigid, machinable, heat resistant materials including acrylic, a LUCITE material, styrene, polystyrene, and polycarbonate may also be used. Conveniently, the elements may be constructed to be essentially transparent so that visualization into body 12 may be facilitated. In a preferred embodiment, the elements are generally amber in color such that wavelengths of light in the range of 200 nm to 700 nm, and more preferably 250 nm to 600 nm, will be prevented from passing therethrough.

As best shown in FIG. 3, coupling element 26 includes a cylindrical hole 40 which is aligned with the rotational axis. Hole 40 is adapted to receive a rotatable shaft so that, as the shaft is rotated, body 12 will rotate about the rotational axis. As shown in FIG. 2, coupling element 28 includes a rotatable sleeve 42 which is adapted to rest upon a bracket (not shown) so that body 12 will rotate about the rotational axis when the shaft in hole 40 is rotated. An exemplary motor unit for rotating body 12 comprises a Rotamix Rotisserie with Digital Display, commercially available from Appropriate Technical Resources, Laurel Md. Preferably, body 12 is coupled to the motor unit, and the motor unit is then placed into the oven or incubator. The motor unit is then actuated to rotate body 12 within the oven.

Referring now to FIGS. 1 and 2, walls 16 and 20 each include a plurality of slots 44. Slots 44 in each of walls 16 and 20 oppose a corresponding slot 46 in wall 18. In this way, a cartridge 48 (see FIG. 5) may be removably mounted to body 12 by inserting the cartridge between a pair of opposing slots 44 and 46. Conveniently, a pair of cross walls 50 are provided to subdivide body 12 into four sections. The division of body 12 into various sections facilitates organization of the various cartridges.

Each pair of opposing slots 44 and 46 are configured such that when the cartridge is inserted into the slots, the cartridge will be generally perpendicular to walls 16, 18 and 20. As described hereinafter, slots 46 are narrower than slots 44 so that the cartridges can only be inserted in one particular orientation. Conveniently, lid 32 is provided with a pair of rubber strips 52 which serve to securely hold the cartridge within slots 44 and 46 when lid 32 is in the closed position.

Figure 5:
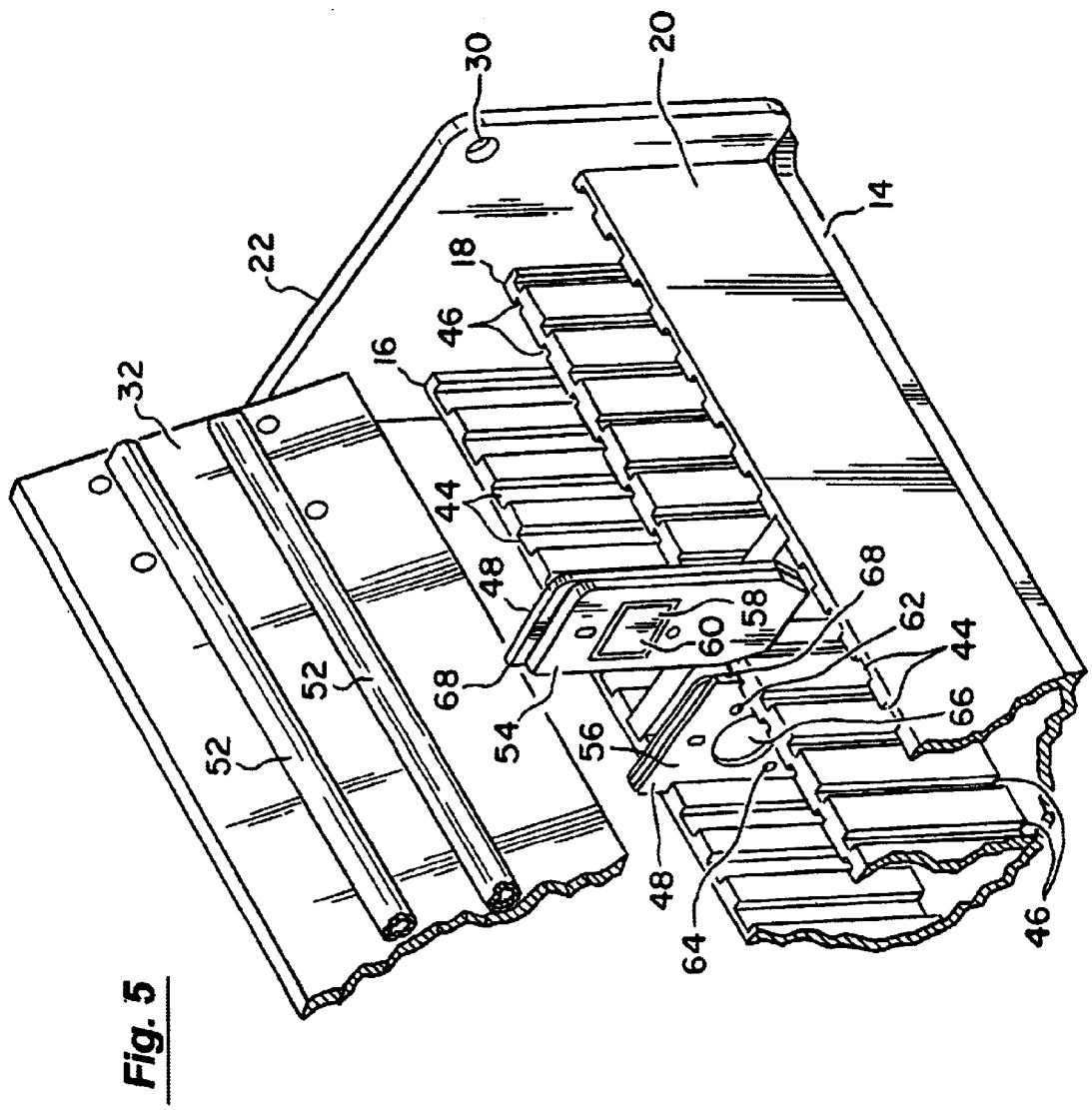
FIG. 5 is a partial cutaway view of the device of FIG. 1 showing a cartridge being inserted into the device according to the invention.

Referring now to FIG. 5, insertion of cartridges 48 into body 12 will be described in greater detail. The particular construction of cartridge 48 is described in co-pending U.S.

application Ser. Nos. 08/624,312, 08/485,452 and 08/528,173 and PCT Application No. WO95/33846, previously incorporated by reference. Briefly, cartridge 48 includes a front 54 and a rear 56. Front 54 includes a cavity 58 which is defined by a generally planar face 60. Positioned across cavity 58 is an array chip (not shown). When the array chip is positioned over cavity 58, a hybridization chamber is formed. The hybridization chamber is generally rectangular or square in geometry and has a narrow width as defined by the distance between planar face 60 and the array chip. An inlet port 62 and an outlet port 64 are included in rear 56 to allow various fluids to be introduced into and removed from the hybridization chamber. Rear 56 further includes a cavity 66, located adjacent the array, which is adapted for receiving a temperature monitoring and/or controlling device employed in other applications.

In particular, as described in U.S. application Ser. No. 08/485,452, now U.S. Pat. No. 5,945,334, selected fluids are introduced into and out of the cavity via the inlet port and the outlet port. In some embodiments, the inlets/outlets are located at opposite ends of the cavity. This configuration improves fluid circulation and regulation of bubble formation in the cavity. The bubbles agitate the fluid, increasing the hybridization rate between the targets and complementary probe sequences.

Cartridge 48 includes an extending edge 68 which is sized to be received into slots 46, while the opposite side of cartridge 48 is adapted to be received in slots 44. In this way, cartridge 48 can only be inserted between a pair of slots 44 and 46 in one orientation as shown in FIG. 5. In such an orientation, planar face 60 is generally perpendicular to the rotational axis. In this way, as body 12 is rotated, the fluid within the hybridization chamber will flow against each edge of the hybridization chamber to facilitate mixing of the fluid.

Figure 6:
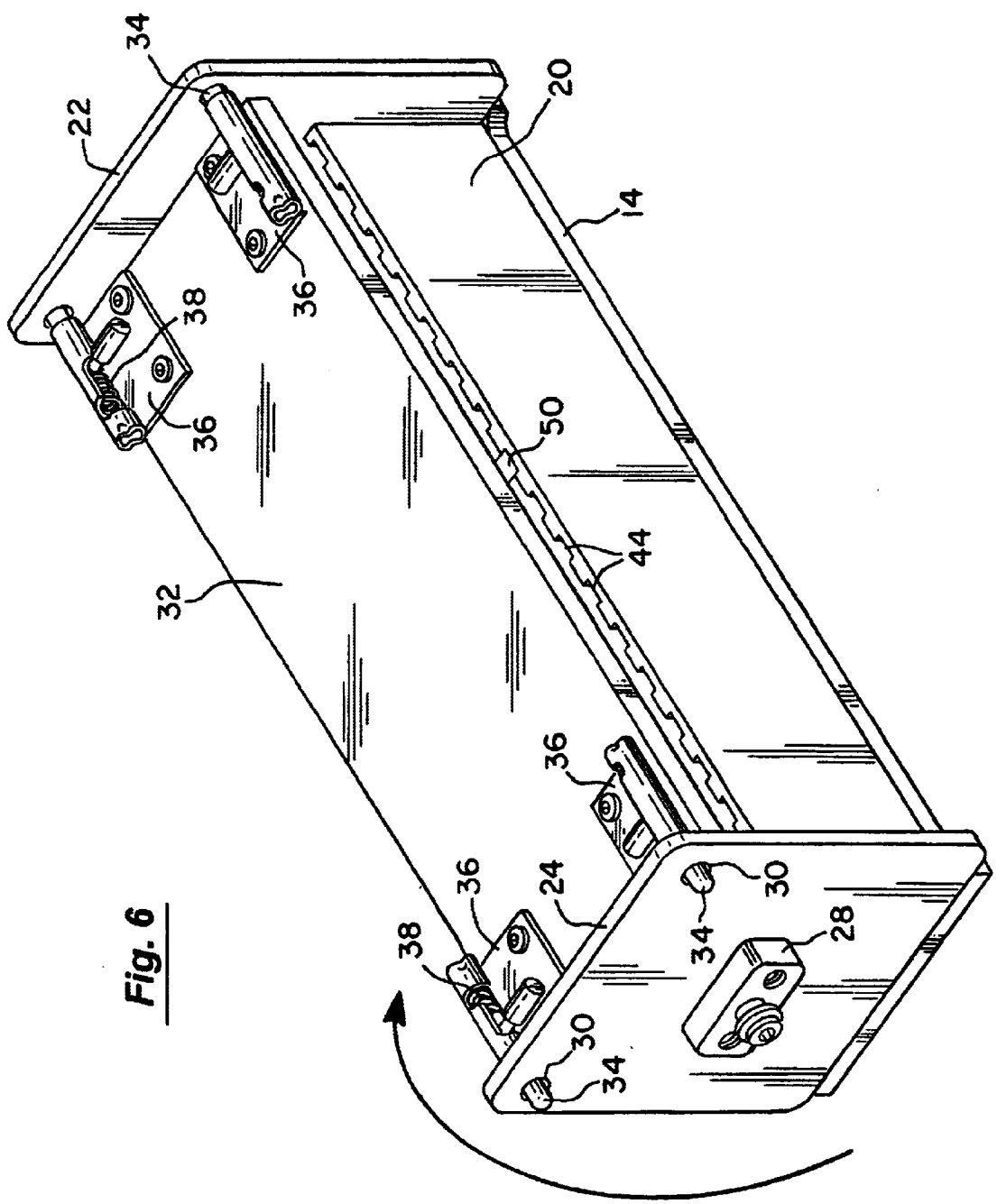
FIG. 6 illustrates a method for rotating the device of FIG. 1 after cartridges have been inserted into the device according to the invention.

Referring now to FIGS. 5 and 6, operation of device 10 to facilitate mixing of a fluid, such as a biological fluid, will be described. Initially, the hybridization chamber within cartridge 48 is at least partially filled with a liquid. Cartridge 48 is then inserted between a pair of opposing slots 44 and 46, with edge 68 being inserted into slot 46. Lid 32 is then closed, with each of rods 34 being received into its respective aperture 30. Strips 52 will be pressed upon cartridge 48 to securely hold the cartridges within the slots. Device 10 is then coupled to a rotation unit and placed within an oven as previously described. The oven is set to the desired temperature, which will typically be in the range from about 30° C. to about 60° C., and more preferably from about 40° C. to about 50° C. While within the oven, the rotation mechanism is actuated to rotate body 12 about the rotational axis as illustrated by the arrow in FIG. 6. Preferably, body 12 will be rotated at a rate in the range from about 30 rpm to about 90 rpm, and more preferably from about 50 rpm to about 60 rpm.

After mixing and heating is completed, device 10 is removed from the oven and lid 32 is opened so that cartridges 48 may be removed. At this point, cartridges 48 may be processed further as is known in the art.

While the foregoing invention has been described in some detail for purposes of clarity and understanding, it will be clear to one skilled in the art from a reading of this disclosure that various changes in form and detail can be made without departing from the true scope of the invention. All publications are incorporated by reference in their entirety for all purposes to the same extent as if each individual publication or patent documents were so individually denoted regardless of whether previously incorporated by reference.

What is claimed is:

1. A system for facilitating the mixing of a fluid, the system comprising:

at least one container containing a polymer array and a fluid; wherein the container defines a chamber, the chamber including a pair of closely spaced-apart faces that are separated by walls to define a narrow interior, wherein one of the faces defines a planar surface on which the polymer array is disposed; and a holding device comprising a body with a rotational axis, a pair of end members extending from the rotational axis, one or more walls extending between the end members parallel to the rotational axis, and at least one coupling member constructed and arranged to couple the container to at least one of the walls, such that when the container is coupled to the coupling member the polymer array is substantially perpendicular to the rotational axis and the container is spaced apart from the rotational axis, and at least one coupling element operably attached to the body in alignment with the rotational axis and adapted to couple the body to a rotation mechanism that rotates the body around the rotational axis.

2. A system as in claim 1, wherein the walls of the chamber are set at angles sufficient to agitate the fluid when rotated.

3. A system as in claim 1, wherein the container is only partially filled with the fluid to form a bubble therein.

4. A system as in claim 3, wherein the fluid contains at least one target molecule and the polymer array contains complementary probe sequences, wherein agitation of the fluid by the bubble increases the hybridization rate between the target molecule and the probe sequences.

5. A system as in claim 1, wherein the end members are perpendicular to the walls.

6. A system as in claim 1, wherein the coupling member comprises a pair of rails fixedly attached to one of the walls to form a slot for receiving the container.

7. A system as in claim 6, wherein the rails are perpendicular to the wall.

8. A system as in claim 1, further comprising an oven, wherein the holding device is rotatably disposed in the oven.

9. A device as in claim 1, wherein the coupling member comprises an elongate slot formed within the wall.

* * * * *